(12) United States Patent
Sung et al.

(10) Patent No.: US 6,296,375 B1
(45) Date of Patent: Oct. 2, 2001

(54) COMPACT FLUORESCENT LAMP HAVING A DETACHABLE TRANSLUCENT COVER

(75) Inventors: Yon W. Sung, Franklin Lakes, NJ (US); Fumin Guan, Shanghai (CN)

(73) Assignee: Maxlite-SK America, Inc., Totowa, NJ (US)

(*) Notice: Subject to any disclaimer, the term of this patent is extended or adjusted under 35 U.S.C. 154(b) by 0 days.

(21) Appl. No.: 09/478,289

(22) Filed: Jan. 5, 2000

(51) Int. Cl.⁷ ..................................................... F21V 3/00
(52) U.S. Cl. ........................... 362/255; 362/216; 362/260
(58) Field of Search ..................................... 362/216, 226, 362/255, 256, 260, 353, 363, 437, 455, 294; 313/318.9, 318.1

(56) References Cited

U.S. PATENT DOCUMENTS

| | | | |
|---|---|---|---|
| 4,074,165 | * 2/1978 | Moriyama | 313/112 |
| 4,763,233 | 8/1988 | Poyer . | |
| 4,787,018 | 11/1988 | Poyer . | |
| 5,015,917 | * 5/1991 | Nigg | 362/260 |
| 5,189,339 | * 2/1993 | Peshak | 362/216 |
| 5,546,291 | 8/1996 | Simes . | |
| 5,580,158 | * 12/1996 | Aubrey et al. | 362/260 |
| 5,720,548 | * 2/1998 | Geary | 362/226 |
| 5,961,204 | 10/1999 | Martich et al. . | |
| 5,971,564 | * 10/1999 | Wang | 362/221 |

* cited by examiner

Primary Examiner—Y. Quach
(74) Attorney, Agent, or Firm—Harris Beach LLP

(57) ABSTRACT

A compact fluorescent lamp including a housing for enclosing a ballast and, optionally, a starter; a fluorescent light tube attached to the housing and electrically connected to the ballast; and a base electrically connected to the ballast and physically attached to the housing for connecting the lamp to an electrical receptacle. The housing is provided at an upper edge thereof with male or female mating elements, for example, threads, tabs, or slots. The lamp further includes a translucent cover or shroud for surrounding the fluorescent tube, having a closed form and being open at an end thereof, and being provided at the open end with male or female mating elements cooperative with the mating elements on the housing to directly, positively, and detachably attach the cover to the housing.

6 Claims, 5 Drawing Sheets

COMPACT FLUORESCENT LAMP HAVING A DETACHABLE TRANSLUCENT COVER

The present invention relates to apparatus for general illumination, more specifically to compact fluorescent lighting apparatus, and most specifically to a compact fluorescent lamp having a detachable translucent cover preferably in the shape of an incandescent light bulb.

Fluorescent lamps having a standard "Edison" base for insertion into a standard threaded light bulb socket are well known. Such a lamp consists typically of one or more coiled, U-shaped, or otherwise folded fluorescent tubes fixedly and electrically attached to a bulbous housing. The housing contains a fluorescent electrical ballast and, optionally, a starter, and is attached to a standard male threaded Edison lamp base.

The brilliant light given off by a compact fluorescent lamp can be harsh and therefore unpleasant to a viewer, as the radiating surface is relatively small and the unit radiance is quite high. Thus, various covers have been proposed for diffusing and/or reflectively directing the radiated light.

For example, U.S. Pat. No. 4,787,018 discloses a fluorescent lamp mounted on a flat circular base and having a cylindrical frosted cover or lens and a domed end cap, the cover being retained on the base by friction and gravity.

U.S. Pat. No. 5,961,204 discloses an assembly comprising a compact fluorescent lamp having a bayonet base which plugs into a housing having a dimmer therein, the lamp being surrounded by an external translucent globe.

U.S. Pat. No. 4,763,233 discloses a floodlamp wherein a dished reflector in a housing surrounds the lower end of a compact fluorescent lamp and a flat, circular, transparent lens is bonded to the upper end of the housing.

A compact fluorescent bulb having a cylindrical frosted translucent cover surrounding the lamp and bonded at a lower end thereof to a ballast housing is available under the registered trade name "Earthlight" from Philips Lighting Company, Somerset, N.J., USA.

U.S. Pat. No. 5,546,291 discloses a floodlamp-shaped cover for a compact fluorescent lamp which is attachable thereto via an intermediate spring-clip adapter.

A compact fluorescent bulb having a frosted translucent cover in the general shape of an incandescent light bulb bonded to a ballast housing is available under the registered trade name "Ultratech" from General Electric Company, Schenectady, N.Y., USA.

For some purposes, an incandescent light bulb shape for a fluorescent lamp cover is very desirable. This shape is traditional and thus can enhance consumer acceptance of compact fluorescent lamps for conventional uses such as in table lamps, floor lamps, and overhead and wall-mounted fixtures in dwellings and offices. Further, the incandescent shape permits attachment of a conventional clip-on lampshade, a benefit not afforded by cylindrical covers. Further, when used in public places, compact fluorescent bulbs are known to be vulnerable to theft, and an incandescent-shaped cover can reduce the incidence of theft by disguising the lamp as an ordinary incandescent bulb.

A drawback of compact fluorescent lamps in general is a somewhat lower radiance output than from incandescent bulbs of comparable size. An additional and substantial drawback of covered bulbs is that the radiance output is further reduced by the cover. A cover, and especially a diffusing or frosted cover, can absorb 15% or more of the lamp output. Thus, what is needed for some applications is a compact fluorescent lamp having an easily detachable cover such that the lamp may be used with its cover attached as desired for light diffusion or without its cover as desired for maximum radiance.

It is a principal object of the invention to provide a compact fluorescent lamp and a cover therefor wherein the cover is easily attachable and detachable by the user.

It is a further object of the invention to provide a cover for removable attachment to a compact fluorescent lamp housing which employs a positive attaching mechanism.

It is a still further object of the invention to provide a compact fluorescent lamp and a cover therefor wherein the cover is detachably connectable directly to the lamp housing without resort to an intermediate adapter.

Briefly described, a compact fluorescent lamp embodying the invention includes a lamp housing for enclosing a ballast and, optionally, a starter; a fluorescent tube attached to the housing and electrically connected to the ballast; and a base electrically connected to the ballast and physically attached to the housing for connecting the lamp to an electrical receptacle. The housing is provided at an upper edge thereof with male or female mating elements, for example, threads, tabs, or slots. The lamp further includes a translucent shroud for surrounding the fluorescent tube, having a closed form and being open at an end thereof, and being provided at the open end with male or female mating elements cooperative with the elements on the housing to directly, positively, and detachably attach the cover to the housing. As used herein, "positively" means mechanical locking means requiring counter rotation of the housing and the cover to effect connection and disconnection therebetween.

The foregoing and other objects, features, and advantages of the invention, as well as presently preferred embodiments thereof, will become more apparent from a reading of the following description in connection with the accompanying drawings in which.

Figure 4A:
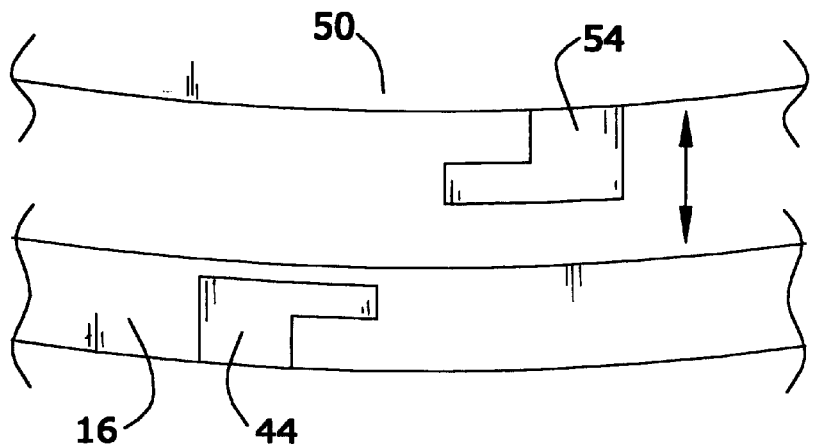
Figure 4B:
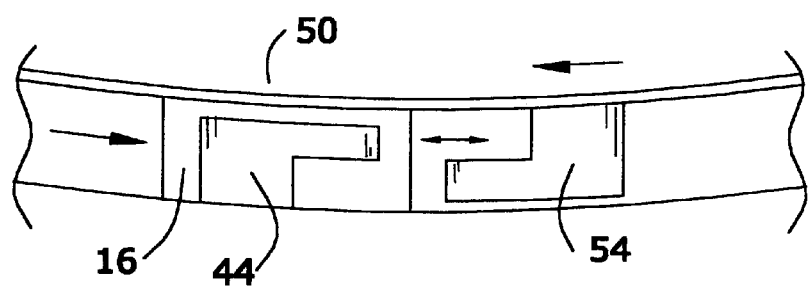
Figure 4C:
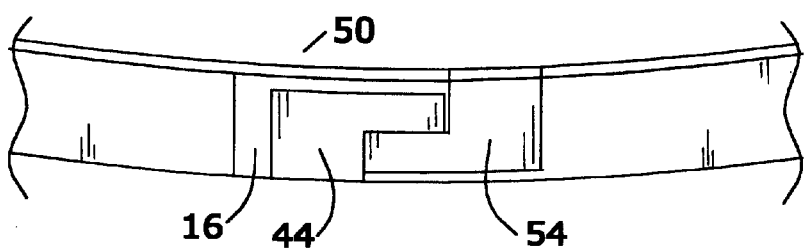
Figure 5:
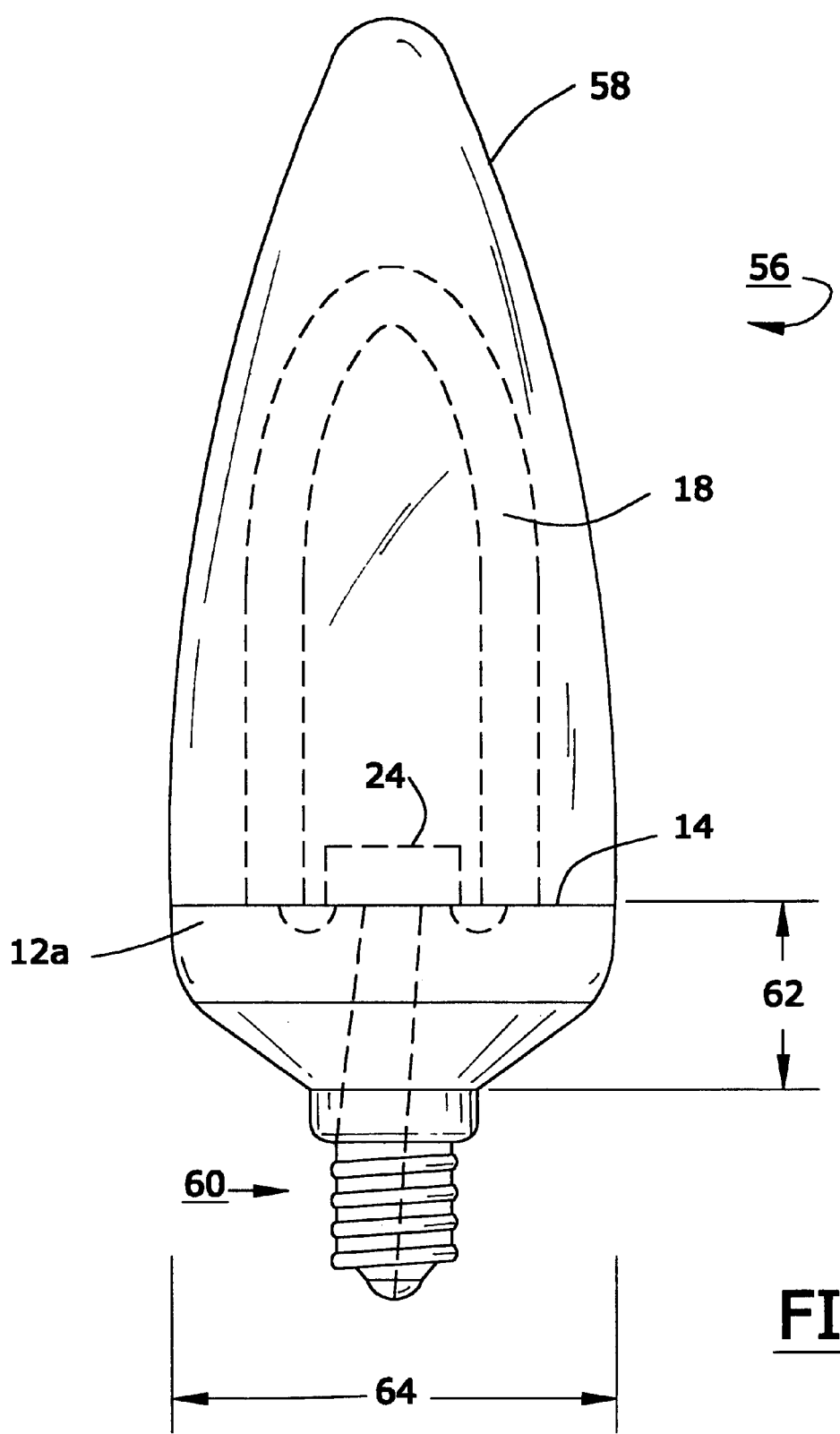

FIGS. 4*a-c* are sequential drawings shoving three steps in the progressive assembly of the cover to the housing in a second embodiment of the invention; and FIG. 5 is an elevational view of a compact fluorescent lamp having a "flame" shaped cover and a candelabra base.

Referring to FIGS. 1 through 4*c*, a first embodiment 10 of a compact fluorescent lamp in accordance with the invention has a conventional housing 12 having an upper surface 14 and contiguous shell wall 16. Upper surface 14 fixedly supports one or more folded fluorescent tubes 18, preferably T3 tubes according to industry standards, the positive and negative electrical leads 20,22 from the tubes extending through surface 14 and being in electrical contact with load terminals (not shown) on fluorescent ballast 24 disposed within housing 12. Housing 12 also supports an electrical base 26 having threads 28 on the outer surface thereof for connecting lamp 10 into a conventional electric light socket (not shown). Of course, base 26 can be alternatively, a bayonet base or any other electrical connecting base convenient to a particular use. Positive and negative power leads 30,32, respectively, extend from power terminals (not shown) on ballast 24 to a central lamp terminal 34 and grounding shell 36 in base 26.

What is described thus far is substantially a conventional compact fluorescent light bulb.

Figure 1:
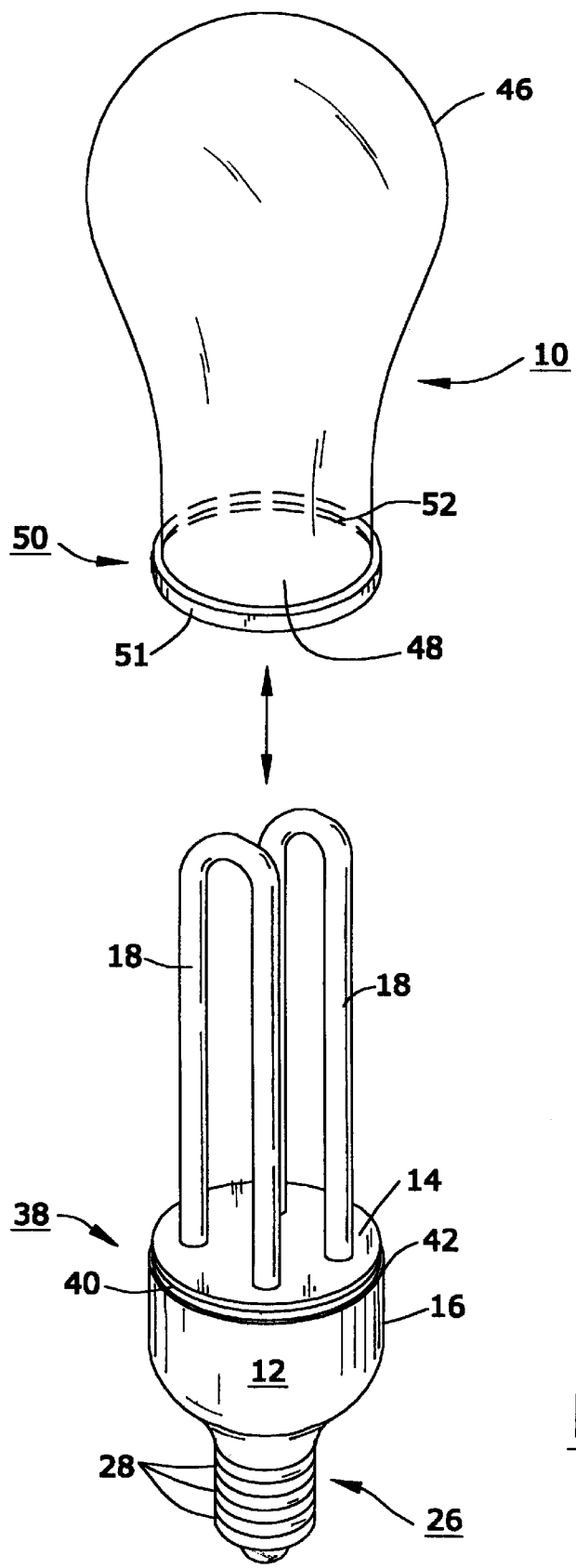
FIG. 1 is an exploded elevational view of a compact fluorescent lamp in accordance with the invention.

At the juncture of wall 16 and upper surface 14, the outer surface of wall 16 is provided with first mating elements 38, preferably male threads 40 as shown in FIG. 1. For neatness of the assembled lamp, the threads are preferably disposed in a shallow annular step 42, although obviously the first mating elements may be provided flush on the surface of wall 16 or even on a raised portion thereof within the scope of the invention. Alternatively to threads, first mating elements 38 may comprise any other mechanical shape capable of cooperating to form a positive and detachable attaching, for example, a circumferentially-disposed plurality of first interlockable tabs 44 disposed on wall 16 as shown in FIG. 4*a*.

Figure 2:
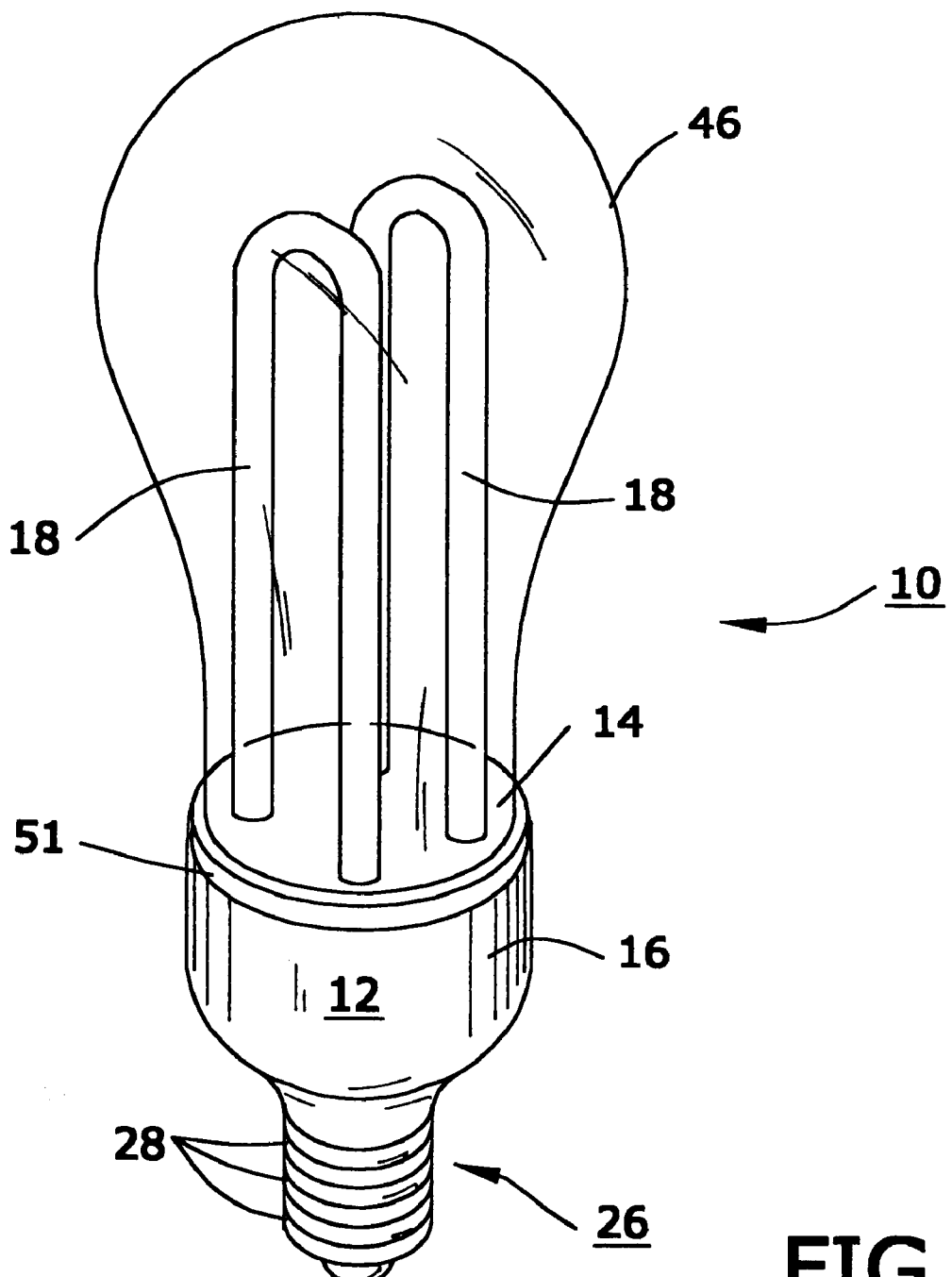
FIG. 2 is an elevational view of the lamp shown in FIG. 1 after assembly.
Figure 3:
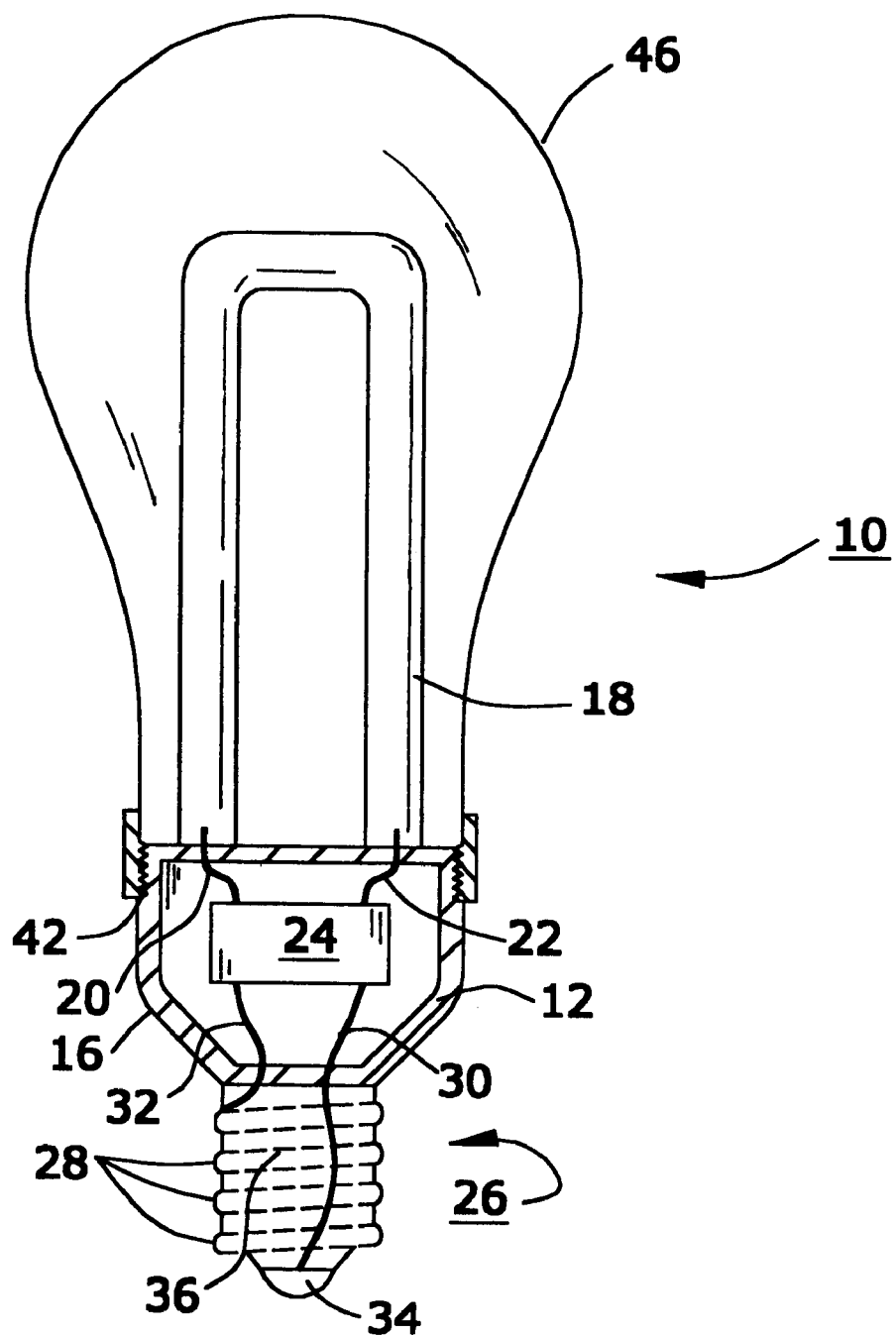
FIG. 3 is a longitudinal cross-sectional view of the lamp shown in FIG. 2.

Lamp 10 further comprises a translucent cover 46 formed of any suitable translucent material, preferably of glass for heat stability. Cover 46 may be transparent or, preferably, frosted or clouded to diffuse the radiance emanating from tubes 18. Cover 46 is a closed form having a single opening 48 and is preferably formed in the general shape of an incandescent light bulb, as shown in FIGS. 1–3. Of course, cover 46 may be formed in any desired shape, for example, as a reflector floodlight, cylinder, cone, sphere, flame, or other shape, within the scope of the invention.

Cover 46 is provided with a second mating element 50 surrounding opening 48. Preferably, opening 48 is fitted with a cylindrical collar 51 extending beyond the open end of cover 46 and, preferably, being provided with female threads 52 on the inner surface thereof for matably engaging with male threads 40 on housing 12 to positively connect and disconnect cover 46 and housing 12, as shown in FIGS. 2 and 3. Such connection is less prone to failure than the simple gravitational or frictional removable connections disclosed in U.S. Pat. Nos. 4,564,890; 4,787,018; and 5,961,204; and provides the option of cover removal which the permanent, non-detachable connections disclosed in U.S. Pat. Nos. 4,363,083 and 4,763,233 do not. Such direct connection between the cover and housing is also simpler than the connection disclosed in U.S. Pat. No. 5,546,291, which requires an intermediate adapter therebetween.

Alternatively, collar 50 may be provided with a circumferentially-disposed plurality of second interlockable tabs 54 which may be axially and rotationally engaged with tabs 44 on housing 12 to effect the positive attachable and detachable connection of cover 46 to housing 12, as shown in FIGS. 4*a* through 4*c*.

Referring to FIG. 5, a compact fluorescent lamp 56 has a housing 12*a* substantially smaller than housing 12. Lamp 56 further includes a "flame" shaped cover 58 and "candelabra" standard base 60. Incandescent lamps having the same base and similar cover shape are readily available for use in, for example, chandelier fixtures. Cover 58 may be fixed to or removable from housing 12*a*. As shown in FIG. 5, ballast 24 may be disposed, if so desired, outside of housing 12 on upper surface 14 and within cover 58 at any convenient location, for example, between the limbs of the folded tube 18, without significantly reducing the total radiance of the lamp. Locating the ballast outside the housing and within the cover can be advantageous in permitting a smaller height 62 and outer diameter 64 of the housing, and also in providing a higher rate of ballast heat dissipation which can be an important advantage, especially in base-up installations. For example, height 62 may be 20 mm or less and diameter 64 may be 40 mm or less. Of course, such locating of the ballast is not confined to candelabra-base compact fluorescent lamps but may be applied within the scope of the invention to any compact fluorescent lamp.

From the foregoing description, it will be apparent that there has been provided an improved compact fluorescent lamp, wherein a translucent cover is positively and detachably attached to a lamp housing by rotationally matable male and female elements. Variations and modifications of the herein described compact fluorescent lamp, in accordance with the invention, will undoubtedly suggest themselves to those skilled in this art. Accordingly, the foregoing description should be taken as illustrative and not in a limiting sense.

What is claimed is:

1. A compact fluorescent lamp, comprising:
   a) a housing;
   b) at least one fluorescent tube mounted on said housing;
   c) a candelabra lamp base mounted on said housing for connecting said fluorescent tube to a source of electricity; and
   d) a flame-shape cover mounted on said housing for surrounding said fluorescent tube.

2. A lamp in accordance with claim 1 further comprising a fluorescent ballast within the housing.

3. A lamp in accordance with claim 1 wherein said housing is less than about 20 mm in length.

4. A lamp in accordance with claim 1 wherein said housing has an outer diameter less than about 40 mm.

5. A lamp in accordance with claim 1 further comprising a fluorescent ballast within the housing.

6. A compact fluorescent lamp, comprising:
   a) a housing having first mating elements disposed on a surface thereof;
   b) at least one fluorescent tube mounted on said housing;
   c) a lamp base mounted on said housing for connecting said lamp to a source of electricity; and
   d) a cover for surrounding said fluorescent tube and having second mating elements disposed thereon matable with said first mating elements to positively and detachably connect said cover directly to said housing without connection to an intermediate adapter, said cover having the shape of an incandescent light bulb, and further comprising a fluorescent ballast disposed outside said housing within said cover.

* * * * *